Patented Aug. 26, 1924.

1,506,317

UNITED STATES PATENT OFFICE.

THOMAS CLARENCE MARSHALL, OF YORKLYN, DELAWARE, AND JAMES LEWIS McCLELLAN, OF KENNETT SQUARE, PENNSYLVANIA; SAID McCLELLAN ASSIGNOR TO SAID MARSHALL.

METHOD OF MAKING RUBBERIZED PARCHMENT PAPER AND THE PRODUCT THEREOF.

No Drawing. Application filed December 16, 1922. Serial No. 607,410.

*To all whom it may concern:*

Be it known that we, THOMAS C. MARSHALL and JAMES L. McCLELLAN, citizens of the United States, residing at Yorklyn, county of New Castle, and State of Delaware, and Kennett Square, county of Chester, and State of Pennsylvania, have invented certain new and useful Improvements in Methods of Making Rubberized Parchment Paper and the Product Thereof, of which the following is a specification.

So far as we are aware no method of incorporating rubber with parchment paper, to produce a homogeneous product has heretofore been devised.

Fibre has been treated with the rubber of commerce dissolved in benzine or like solvents, but the penetration of the fibre is practically nil and the process is of no commercial value. Sheet rubber has been vulcanized to sheets of fibre by the usual sulphur vulcanizing process but no permeation of the fibre by the rubber results and the laminations of rubber and fibre are extremely liable to separate.

The vulcanized fibre heretofore produced has been bulky in comparison with its strength, wanting in flexibility and unsatisfactory in its electrical and moisture resisting qualities.

The purpose of our invention is to produce a new article of manufacture consisting of rubber and fibre, homogeneously compounded throughout the mass, which will be strong, pliable, flexible, durable and an effective non-conductor of moisture and electricity.

We have discovered that such an article may be produced by the introduction of rubber latex. This is a colloidal emulsion of rubber in water and contains about thirty per cent of pure rubber.

In the preferred method of carrying out our invention, we first dilute the latex with about ten times the volume of water, then thoroughly mix a measured quantity of the product with refined paper pulp, then coagulate with alum or an acid. This causes the colloidal particles of rubber to unite in a reticulated structure which forms a thin film around the individual fibres. This film is insoluble in water. The paper is then run out on a paper machine, a cellulose gelatinizing agent such as zinc chloride or sulphuric acid introduced, the excess acid removed and the paper dried and pressed.

The latex is preferably incorporated with the paper stock when the latter is approaching the final stage of beating and the beating continued until the latex has been thoroughly incorporated. If coloring matter is to be used it is preferably introduced prior to the introduction of the latex solution.

The proportion of latex used may vary within a wide range. We have found that by adding a quantity of the latex to the paper stock sufficient to make the rubber content of the finished product five per cent, the finished gelatinized fibre is materially improved in its flexibility and in its moisture resisting and dielectric properties. By the addition of a larger proportion of the latex a more flexible and better resistant product may be produced, but we have obtained the best results with a rubber content not exceeding fifteen per cent.

The latex may also be applied to paper which contains no rubber or to paper which does not contain sufficient rubber for a special purpose. This may be done by taking paper made in the usual way and passing it through a latex solution of sufficient strength. The paper absorbs the latex and becomes uniformly impregnated with it. The paper is then passed through a coagulating bath, dried calendered and the cellulose fibres hydrated.

After coagulation, the rubber forms a thin film surrounding the individual cellulose fibres.

The steps, other than incorporation of the latex with the paper pulp or paper are well known and need not be described.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by letters Patent is:—

1. The herein described method of making rubberized fibre consisting in adding rubber latex to paper in the process of manufacture, coagulating the latex and hydrating the cellulose.

2. The herein described method of making rubberized fibre consisting in incorporating rubber latex with paper pulp, coagulating the latex, making the product into paper and hydrating the paper.

3. The herein described method of making rubberized fibre consisting in incorporating rubber latex with paper pulp, coagulating the latex, washing out the coagulent, making the product into paper and hydrating the paper.

4. The herein described method of making rubberized fibre consisting in impregnating paper with rubber latex, coagulating the latex and drying, calendering and hydrating the paper.

5. The herein described method of making rubberized fibre consisting in incorporating rubber latex with paper pulp, coagulating the latex, making the product into paper, impregnating the paper with rubber latex, treating the paper with a coagulent, then drying and hydrating the paper.

6. As a new article of commerce, a homogeneous compound of rubber and gelatinized fibre.

In testimony whereof we have signed our names to this specification in the presence of two subscribing witnesses.

THOMAS CLARENCE MARSHALL.
JAMES LEWIS McCLELLAN.

Witnesses:
SAMUEL S. DENNISON,
ARTHUR H. ARMSTRONG.